Figure 1:
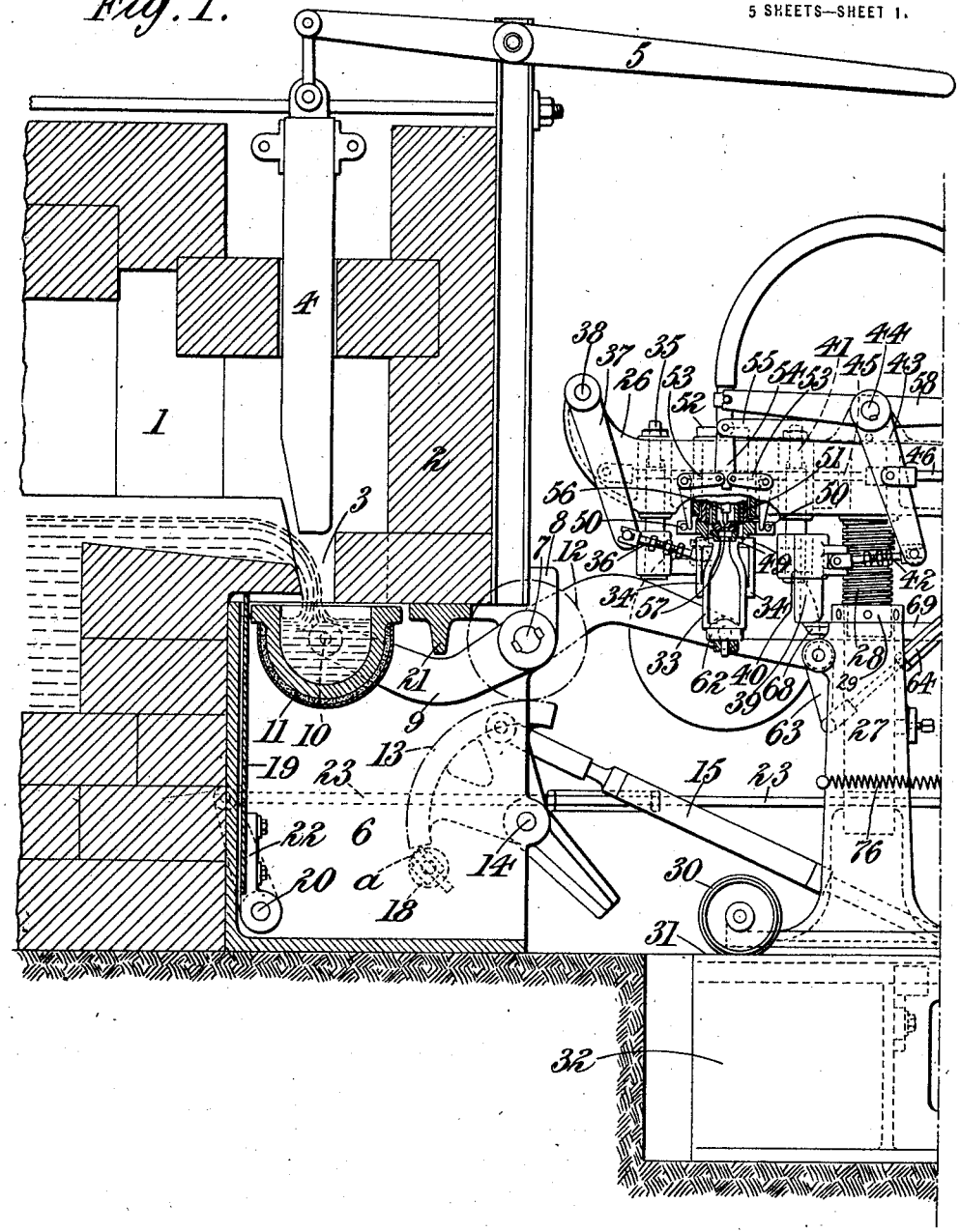

E. ROIRANT.
MACHINE OR APPARATUS FOR THE MANUFACTURE OF BOTTLES AND OTHER BLOWN GLASSWARE.
APPLICATION FILED APR. 10, 1919.

1,438,665.

Patented Dec. 12, 1922.

5 SHEETS—SHEET 1.

Inventor.
Emile Roirant.

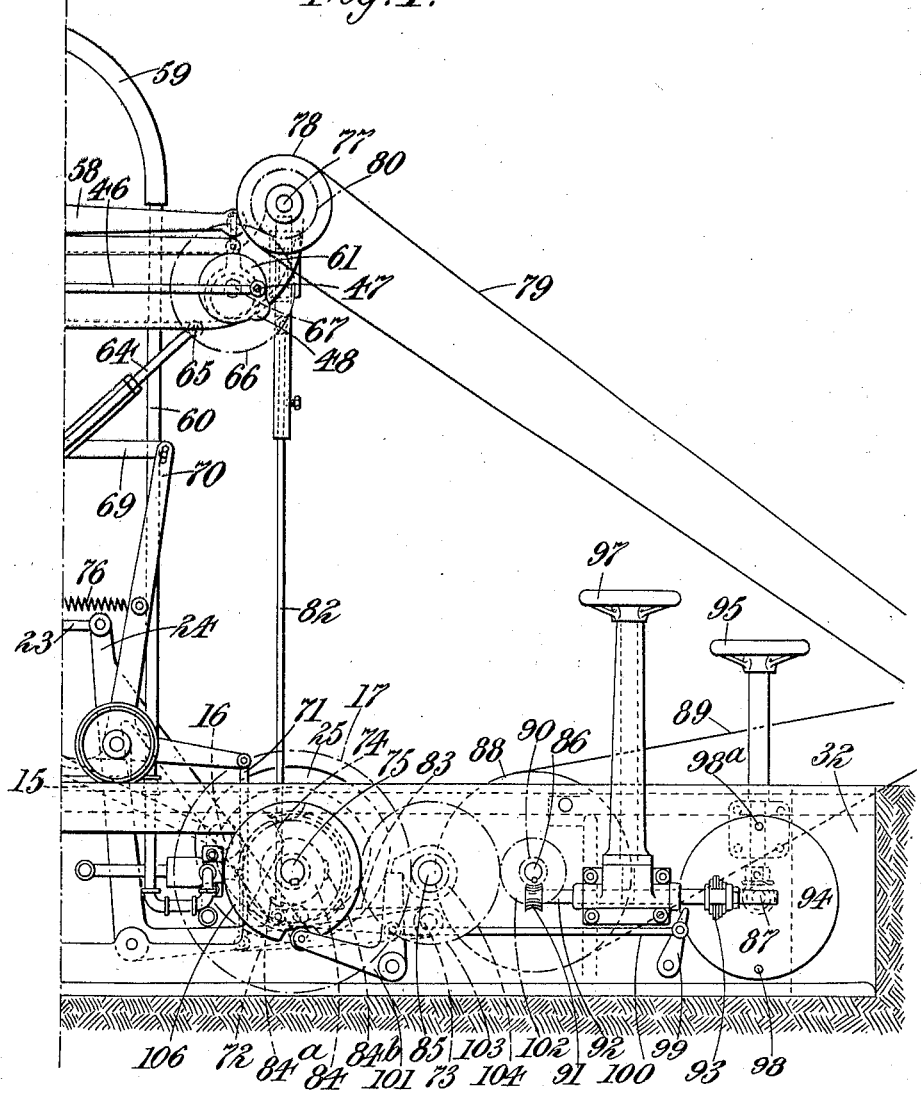

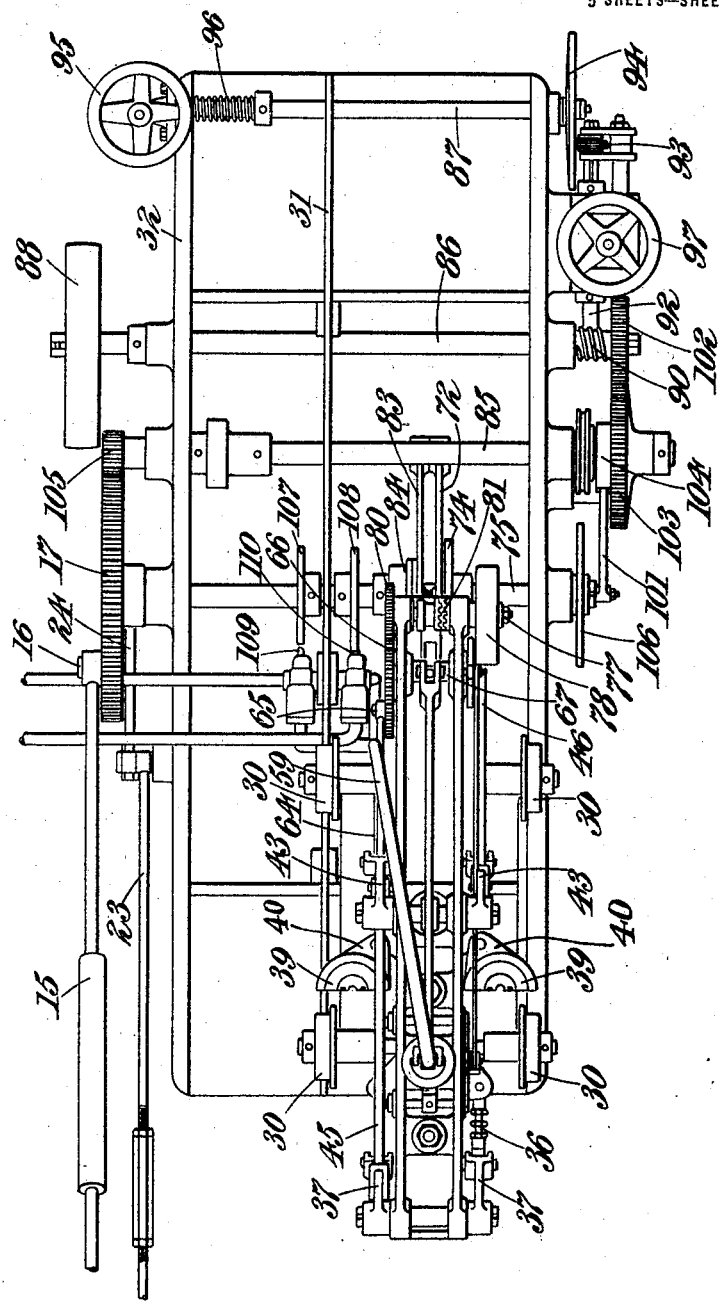

E. ROIRANT.
MACHINE OR APPARATUS FOR THE MANUFACTURE OF BOTTLES AND OTHER BLOWN GLASSWARE.
APPLICATION FILED APR. 10, 1919.
1,438,665.
Patented Dec. 12, 1922.
5 SHEETS—SHEET 4.
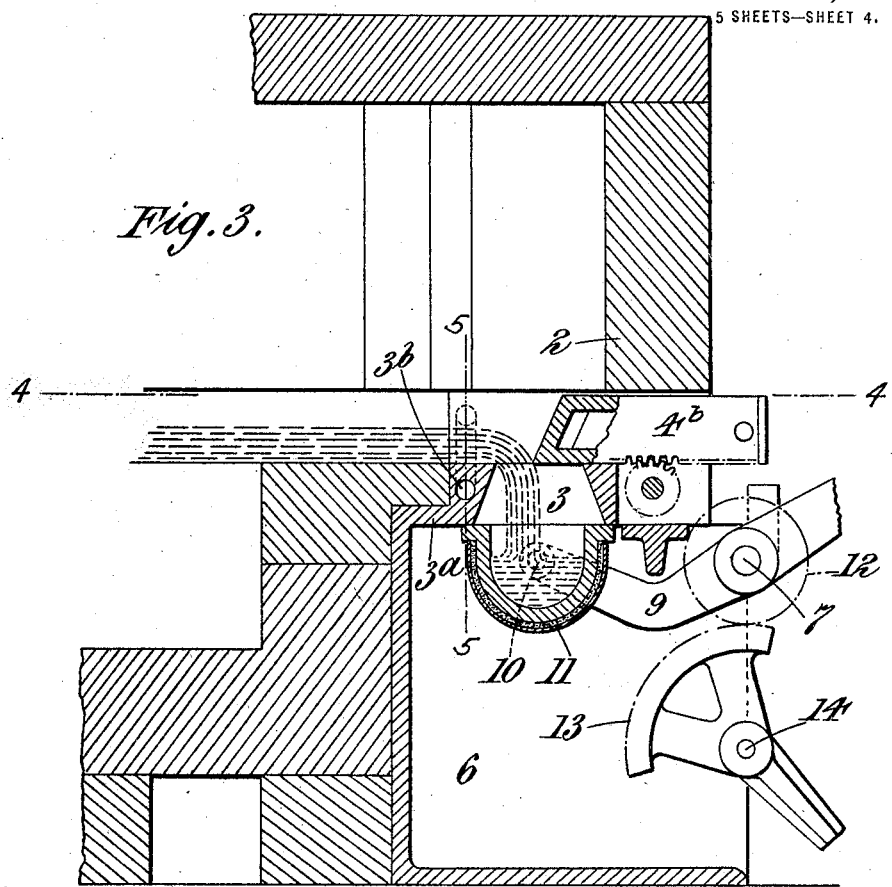
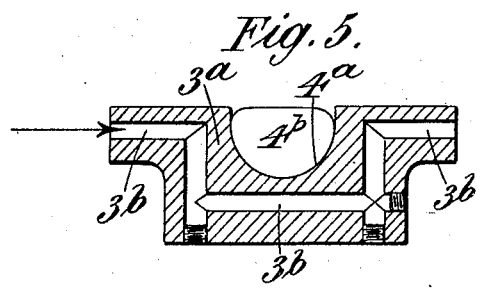
Inventor.
Emile Roirant.

E. ROIRANT.
MACHINE OR APPARATUS FOR THE MANUFACTURE OF BOTTLES AND OTHER BLOWN GLASSWARE.
APPLICATION FILED APR. 10, 1919.
1,438,665.
Patented Dec. 12, 1922.
5 SHEETS—SHEET 5.
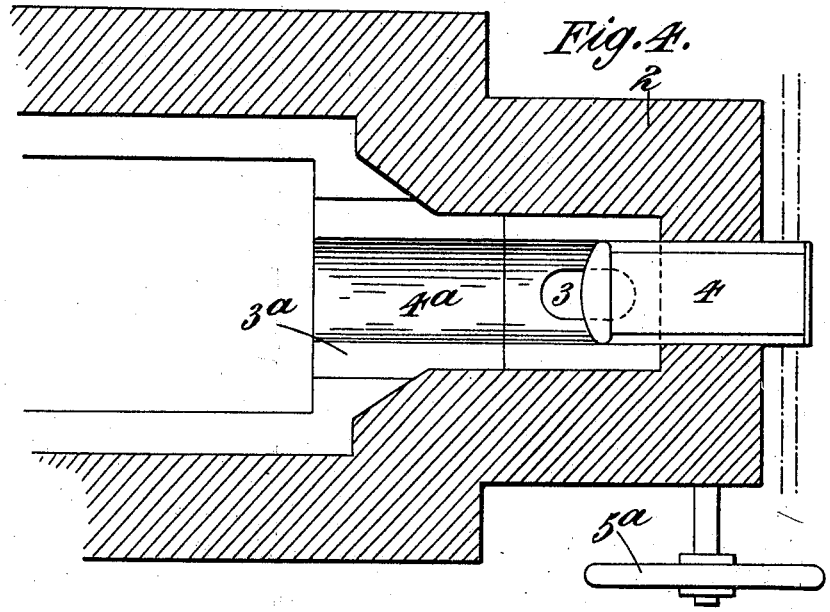
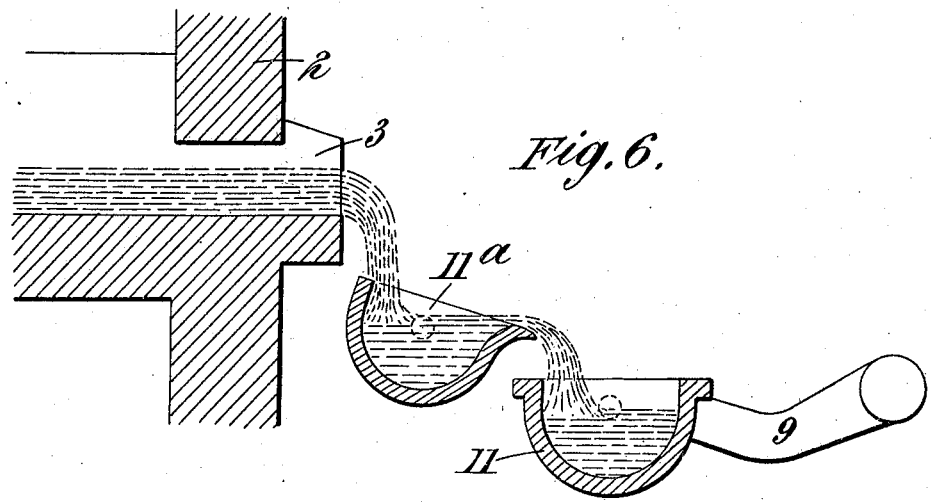
Inventor,
Emile Roirant.
Per John D Raworth
Atty.

Patented Dec. 12, 1922.

1,438,665

UNITED STATES PATENT OFFICE.

EMILE ROIRANT, OF ST.-OUEN, FRANCE, ASSIGNOR TO ARTHUR WILZIN, OF ST.-OUEN, SEINE, FRANCE.

MACHINE OR APPARATUS FOR THE MANUFACTURE OF BOTTLES AND OTHER BLOWN GLASSWARE.

Application filed April 10, 1919. Serial No. 289,012.

*To all whom it may concern:*

Be it known that I, EMILE ROIRANT, a citizen of the Republic of France, and resident of St.-Ouen, Seine, France, have invented new and useful Improvements in or in Connection with Machinery or Apparatus for the Manufacture of Bottles and Other Blown Glassware, of which the following is a specification.

This invention of improvements in or in connection with machinery or apparatus for the manufacture of bottles and other blown glassware, hereinafter comprised in the term bottles, has relation to the manufacture of bottles in or by automatic machinery or apparatus, and the invention has for its object to provide an installation of improved machinery or apparatus, and also machinery or apparatus by which it is possible to alter the duration of the contact of the glass with the parison mould and with the finishing mould and to make alteration in the duration of the glass contact with the finishing mould without affecting the other cyclical movements or phases of the machinery or apparatus.

Machinery or apparatus for the manufacture of bottles in accordance with this invention, comprises the combination of a glass melting furnace, a receptacle or container for molten glass, a glass shaping and blowing machine arranged in front of the receptacle or container and at a distance therefrom, a transporter for the molten glass, and means which automatically reciprocates the said transporter to and fro between the receptacle or container and the parison mould and also operates the moulds and the valves of the glass shaping and blowing machine, said means operating the transporter and the moulds and valves in correct functional co-relationship.

Further in accordance with this invention, the means operating the transporter and the moulds and valves also comprises means for varying at will the durations of the periods of glass contact with the parison mould and with the finishing mould, the variations, in the case of the parison mould, being effected by two cams relatively adjustable on a cam carrying member, and, in the case of the finishing mould, by a disc whose rate of rotation is variable at will.

Referring now to the accompanying drawings:—

Fig. 1 is a diagrammatic elevational view, part being in section, of an installation;

Fig. 2 a plan view of a part of the installation, with certain details of the mechanism of the glass shaping and blowing machine and of the driving and controlling means omitted;

Fig. 3 a vertical section of a receptacle or container from which molten glass is poured intermittently into a glass transporter;

Fig. 4 a horizontal section on the line 4—4 of Fig. 3;

Fig. 5 a vertical section on the line 5—5 of Fig. 3; and

Fig. 6 a diagrammatic representation of a modified construction of chamber from which molten glass passes continuously into a receptacle from which it is poured intermittently into a glass transporter.

1 is a glass melting furnace, which has a forward receptacle or container 2 that constitutes a pouring chamber. The pouring chamber has, in its lower portion, an opening 3, which forms an outlet for molten glass and is controlled by an obturator 4. The obturator shown in Fig. 1 comprises a plunger that is suspended from, and is raised or lowered by a lever 5. The obturator may be of a construction other than that shown in Fig. 1, and in Figs. 3 and 5 inclusive, there is shown a construction comprising a horizontal metal plunger $4^b$ of semi-circular, or approximately semi-circular, shape in cross section mounted and movable longitudinally in a correspondingly shaped recess $4^a$ in a casting $3^a$ in which the outlet 3 is formed. The plunger $4^b$ is moved to open or close the outlet 3 by a handwheel $5^a$, which is geared thereto by rack and pinion mechanism. The plunger $4^b$ is water cooled, as is also the casting $3^a$; $3^b$ are passages or ducts in the casting for the cooling water.

6 (Fig. 1) is a supplementary chamber situated below the pouring chamber 2 and in controlled connection therewith through the opening 3. 7 is a shaft carried in brackets 8 mounted on the exterior of the pouring chamber 2 and extending across the upper part of the front of the supplementary chamber 6. On the shaft 7, two arms 9 are keyed; the outer or free ends of these arms are formed to receive trunnions 10 on the ends of a receptacle 11, which comprises a metallic casing, semicircular, or approximately so, in cross section, lined with refactory material and so mounted that its mouth or open upper part is always uppermost. The receptacle 11 receives molten glass, which is delivered through the outlet 3, and transports it to the place at which gathering is effected. Instead of the pouring chamber 2 being provided with a controlled outlet 3 and the molten glass being delivered intermittently into the transporter 11, the outlet 3 may be uncontrolled and the molten glass may pass therethrough continuously. Fig. 6 shows a pouring chamber 2 with an uncontrolled outlet 3 and a transporter 11, there being, in addition, a receptacle or container 11ᵃ situated between the outlet 3 and the transporter 11 and into which the molten glass pours continuously from the chamber 2. The receptacle or container 11ᵃ is pivotally mounted, and is turned or tilted periodically to pour glass into the transporter 11; the turning or tilting of the vessel 11ᵃ is effected by any convenient means.

12 (Fig. 1) is a pinion keyed on the shaft 7 and meshing with a toothed sector 13 mounted on a stud 14 on one of the side walls of the supplementary chamber 6. 15 is a spring rod, which is connected at one end with the toothed sector 13 and at the other end with a crank pin 16 on a spur wheel 17 on a shaft 75 mounted in a framework 32 hereafter referred to. When the spur wheel 17 is driven, the shaft 7 is rotated, first in one direction and then in the other, and the transporter 11 is caused to move from below the outlet 3 (or receptacle or container 11ᵃ) and out of the supplementary chamber 6 to a position below the parison mould of the glass shaping and blowing machine, and from the position just mentioned to that in which it is shown in Figs. 1, 3 and 6. The spring rod 15 is adjustable in length and this adjustability places the spring therein under greater or less stress and provides a means whereby the duration of the dwell of the transporter below the outlet 3 and the parison mould can be varied to suit the character of the bottle being manufactured and/or the quality and condition of the glass. The alteration in length is made when the end a of the toothed sector 13 is in contact with a stop 18 on one of the side walls of the supplementary chamber 6. Or the transporter 11 may be caused to dwell below the parison mould by temporarily disconnecting the driving and controlling means, as hereafter explained, from the prime mover.

19 is a door that is hinged on a rod 20 carried by the side walls of the supplementary chamber 6 and extending across the chamber adjacent the angle formed by, and between, the rear and bottom walls thereof. The door 19 occupies either a vertical position, as shown, or an inclined position in which its upper edge rests against, and is supported by, an abutment 21, and escape of heat from the supplementary chamber 6 is prevented or minimized. A lever 22 is keyed on the rod 20 and its free end is connected with one end of a coupling rod 23, that is adjustable in length and whose other end is connected with one arm of a bell crank lever 24 pivotally mounted on a framework 32 hereafter referred to: the second arm of the bell crank lever 24 engages a cam groove 25 formed in one face of the spur wheel 17 already mentioned. The transporter 11 and door 19 are thus actuated from the same piece of mechanism and the gearing and connections are such that the door 19 moves towards, or from, its inclined position synchronously with the movement of the transporter 11 out of, or towards and into, the supplementary chamber 6. The glass in the transporter 11 is kept hot by heat radiated from the walls of the supplementary chamber or it may be kept at its proper temperature or be heated electrically; in the latter case, the transporter 11 is provided at the bottom, and at each end, with an electrode to which conductors from a source of electrical energy are attached.

The glass shaping and blowing machine employed in the installation is of the type in which the glass is sucked up from below through the open bottom of the parison mould, and is further of the kind comprising, essentially, a parison mould formed in two parts, opened and closed about the axis of the suspended parison, a finishing mould formed in two parts opened and closed about the same axis, interlocked means for closing the moulds consecutively about this axis, and a neck mould which supports the parison without movement during the substitution of the finishing mould for the parison mould. A glass shaping and blowing machine of the type and kind referred to is described and claimed in the specification of Letters Patent No. 1,337,723 granted April 20, 1920 to the applicant herein.

The glass shaping and blowing machine is situated in front of the glass melting furnace 1 and at a distance therefrom so as to be, more or less, protected from the heat thereof. The several parts constituting the glass shaping and blowing machine are mounted on a rectangular framework 26.

which is carried by a standard comprising a hollow column 27 with base and a screw threaded column 28 that passes down within the column 27 and is movable up and down, without rotation, by a nut 29. Adjustment vertically of parts of the glass shaping and blowing machine to suit the vertical dimensions of bottles under manufacture is thus provided for, and provision is also made for movement of the glass shaping and blowing machine as a whole towards, and away from, the furnace 1 by mounting the column 27 on wheels 30 and providing a track 31 for these wheels at right angles to the front of the furnace 1. In Fig. 1, the track 31 is shown as situated on the upper and exterior part of the framework 32 in which the several parts constituting the driving and controlling means are contained.

33 is the finishing mould, and 34 are the carriers for the two parts thereof. The carriers 34 are both hinged on a pin 35 that is carried by the framework 26 and is adjustable vertically in relation thereto; they are also coupled by links 36, which are adjustable in length, to levers 37, which are mounted on a shaft 38 carried by the framework 26.

39 is the parison mould, and 40 are the carriers for the two parts thereof. The carriers 40 are both hinged on a pin 41 that is carried by the framework 26 and is adjustable vertically in relation thereto; they are also coupled by links 42, which are adjustable in length, to levers 43, which are mounted on a shaft 44 carried by the framework 26.

The moulds and their carriers are mounted in the same vertical plane. One of the levers 37 is coupled by a connecting rod 45 with one of the levers 43 and the other of the levers 43 is coupled by a connecting rod 46 with a crank pin 47 on an eccentric 48. When the eccentric 48 is driven the levers 37, 43 are actuated simultaneously and impart opposite movements to the moulds 33, 39, one mould being caused to close and the other to open.

49 is the neck mould, the two parts of which are each mounted on, and carried by, a slide 50. The two slides 50 are mounted in a neck mould carrier 51, and are movable rectilineally in relation thereto. The neck mould carrier 51 is stationary, that is to say it does not move from its position in relation to other parts of the machine; it has a flange 52 at its upper part and by this flange it is suspended from the framework 26. The suspension of the neck mould carrier 51 is such that when the neck mould 49 is embraced either by the parison mould or by the finishing mould, the carrier can move easily and freely and permit the neck mould 49 to assume a position central of the embracing mould. 53 are, in effect, bell crank levers, and these levers are mounted on opposite sides of the carrier 51; one arm of each lever engages with one of the slides 50 and the other arms are coupled by a link 54 to one end of a lever 55 pivotally mounted on the framework 26. The other end of the lever 55 rests on the eccentric 48 and is actuated thereby. The eccentric 48 acts as a cam in connection with the lever 55. The slides 50 are connected together by springs (not shown) which tend to hold the two parts of the neck mould in contact.

The carrier 51 also forms a part of the means which connect the parison mould with a chamber or vessel in which a vacuum is maintained, and the finishing mould with a reservoir of air under pressure. The carrier 51 also constitutes a container and guide for a hollow rod 56, which carries, at its lower end, the former 57 for the mouth of the bottle neck. The carrier 51 is hollow and through its upper end, which is otherwise closed, the hollow rod 56 extends and is connected with one end of a lever 58 pivotally mounted on the framework 26 and the other end of which is connected with, and is operated by, an eccentric 61. The upper end of the hollow rod 56 is also connected with one end of a flexible tube 59, the other end of which is connected with a pipe 60 connected with valve mechanism adapted to place the vacuum chamber or the air reservoir in connection with the appropriate mould.

62 is the bottom mould. This mould is carried by one arm of a bell crank lever 63 mounted on the column 27; the other arm of the bell crank lever 63 is coupled by a rod 64, which is adjustable in length, with a crank pin 65 on a spur wheel 66. The spur wheel 66, the eccentric 48 and the eccentric 61 are mounted on the same shaft 67, and this shaft 67 is mounted in bearings in the framework 26. The mode of mounting and actuating the bottom mould 62 permits it to be moved clear of the finishing mould so that it does not offer any interference to the delivery of the completed bottle therefrom.

68 is the knife by which the string or rope of glass pendent from the bottom of the parison mould at the completion of the gathering operation and on removal of the transporter 11, is cut off. The knife 68 is mounted at one end of a rectangular rod 69, which passes through a slot or groove in the column 28. The other end of the rod 69 is connected with one arm of a bell crank lever 70 mounted on the base of the column 27; the other arm of the bell crank lever 70 is connected by a link 71 with a lever 72 mounted on a shaft 73 in the framework 32. The lever 72 is actuated by a cam 74 on the shaft 75 mounted in the framework 32. 76 is a spring connected at one end with the lever 70 and at the other end with the column 27; the spring 76 tends to move the knife 68 in a direction to cut off the pendent string or rope of glass.

77 is a two part shaft mounted on the upper side, and at one end, of the framework 26. On one part of the shaft 77 is a pulley 78, which is driven continuously by an electric motor or other prime mover, as through a belt 79, and on the other part of the shaft is a pinion 80, which meshes with, and drives the spur wheel 66. The two parts of the shaft 77 each carry one part of a clutch 81. The two parts of the clutch 81 are normally out of driving connection, and are rendered operative, and the two parts of the shaft clutched together, by mechanism actuated by a rod 82, which, in turn, is operated by a lever 83 mounted on the shaft 73. The lever 83 is actuated by cams $84^a$, $84^b$ which are carried by a member 84 mounted on the shaft 75. The cams $84^a$, $84^b$ are of such length and the cam carrying member 84 is driven at such speed that each time a cam comes into contact with, and operates, the lever 83, the clutch 81 is thrown into action and so maintained for a time sufficient to permit the pinion 80 to make one complete revolution. The cams $84^a$, $84^b$ are also mounted on the cam carrying member 84 in such wise that one is adjustable angularly in relation to the other; the cams can thus be brought nearer together or moved apart. The angular separation of the cams controls the duration of the time during which the parts of the shaft 77 are disconnected, and the parison mould remains closed. It, therefore, acts to control the duration of the glass contact with this mould. The pinion 80 meshes, as mentioned, with the spur wheel 66 and the ratio of these two wheels is such that the shaft 67 makes a complete revolution for each two revolutions of the shaft 80. The rotation of the spur shaft 67 is not continuous, but is in the nature of a step by step motion, and at each movement it turns through half a revolution. The first half revolution of the shaft 67 imparts through the parts (spur wheel 66, cam 48 and eccentric 61) mounted thereon opening movement to the finishing mould 33, closing movement to the parison mould 39, lowers the hollow rod 56 and the bottom mould 62 and effects the opening and closing of the neck mould 49; the second half revolution of the shaft 67 imparts opening movement to the parison mould 39, closing movement to the finishing mould 33 and raises the hollow rod 56 and the bottom mould 62. The complete cycle of movements of the glass shaping and blowing machine thus takes place during one complete revolution of the shaft 67.

The parts of the driving and controlling means of the installation are contained, as mentioned, within the framework 32. 73, 75, 85, 86 and 87 are five parallel shafts mounted in this framework. On one end of the shaft 86 is mounted a pulley 88, which is driven continuously from an electric motor or other prime mover, as through a belt 89; on the other end of the shaft is a worm 90 which meshes with a worm wheel 91 on a shaft 92 mounted in bearings exteriorly of the framework 32 and also carrying a roller 93, which normally is in contact with, and drives a circular disc 94 mounted on one end of the shaft 87. The shaft 87 is so mounted that it can be moved endwise in its bearings in the framework 32 and the disc 94 be moved into or out of contact with the roller 93. Endwise movement is imparted to the shaft 87 by a handwheel 95, which acts through a cam on the shaft. The roller 93 is mounted on its shaft 92 so that it can be moved longitudinally thereof and diametrically of the disc 94; its position is adjusted by a hand wheel 97 acting through a train of gearing. The rate of rotation of the disc 94 is increased or decreased by moving the roller 93 towards or away from its centre and the disc 94 is thrown in or out of action by moving it into or out of contact with the roller 93. In the operation of the installation, the cycle of operations of the glass shaping and blowing machine takes place in the time in which the disc 94 makes a complete revolution. The disc 94 controls, as will hereafter appear, the operation of the driving and controlling means, and by varying its rate of rotation it is possible to vary at will the time duration of the glass contact with the finishing mould to suit the character of the bottle being manufactured and/or the quality and condition of the glass which the machine is working. This variation in the duration of the glass contact with the finishing mould is effected without affecting the other cyclical movements or phases of the installation.

98 is a pin mounted on the disc 94: this pin, as the disc 94 rotates, comes into contact with, and moves a lever 99, mounted on the framework 32 and connected by a link 100 with one arm of a bell crank lever 101, also mounted on the framework 32. The bell crank lever 101 constitutes a clutch latch.

102 is a pinion mounted on the same end of the shaft 86 as the worm 90 and meshing with spur wheel 103 loosely mounted on one end of the shaft 85. The spur wheel 103 is adapted to be coupled to the shaft 85 by a clutch 104 of the type which causes instantaneous motion upon removal of the clutch latch 101 and instantaneous stoppage upon its return.

On the other end of the shaft 85 is mounted a pinion 105 which meshes with the spur wheel 17 on the shaft 75. This shaft 75 carries, as already mentioned, the cam carrying member 84 and cam 74, and also a cam 106, which co-operates with the second arm of the clutch latch 101, a cam 107, which co-operates with a valve 109 connected with the vacuum chamber and a cam 108, which co-operates with a valve 110 connected with the air reservoir.

The installation operates in the following manner:—

Let it be assumed that the parts are in the position shown in Fig. 1 and that the finishing mould 33 contains a bottle. Let it be assumed also that the disc 94 is rotating. During the time that the pin 98 is moving from the position in which it is shown towards and into contact with the lever 99, the transporter 11 is receiving a charge of glass through the outlet 3 from the pouring chamber 2. The supply of glass is stopped at the proper moment by the closing of the outlet 3 by means of the plunger 4. The disc 94 is being driven from the electric motor or other prime mover through the belt 89, pulley 88 and shafts and gearing 86, 90, 91, 92 and roller 93. When the pin 98 comes into contact with the lever 99, it throws this lever over and, through the connecting link 100, operates the clutch latch 101. The clutch 104 immediately couples up the spur wheel 103 with the shaft 85 and the drive is transmitted from the shaft 86 through the pinion 102, spur wheel 103, clutch 104 to shaft 85. The rotation of the shaft 85 is transmitted to the shaft 75 through the pinion 105 and spur wheel 17. As soon as the shaft 75 is set in rotation, the cam 106 acts on the clutch latch 101, and maintains it in the position into which it has been moved by the lever 99 and link 100. The spur wheel 17 through the crank pin 16 and cam groove 25 causes the transporter 11 to move from below the outlet 3 and out of the supplementary chamber 6 towards the axis of the moulds and the door 19 to move towards its inclined position. Before, however, the transporter 11 arrives below the axis of the moulds, the cam 84<sup>b</sup> on the cam carrying member 84 comes in contact with the lever 83 and actuates the clutch 81 through the rod 82, thus coupling up the two parts of the shaft 77, the drive from the pulley 78 being thus transmitted to the pinion 80 and spur wheel 66 and shaft 67. The shaft 67 is rotated through a half revolution and this movement causes, as already explained, the opening of the finishing mould 33, the swinging out of the way of the bottom mould 62, the opening of the neck mould 49, the dropping away of the bottle, the closing of the parison mould 39, and the downward movement of the hollow rod 56. The parison mould 39 being now closed, the transporter 11 arrives below said mould and continues its movement until the glass contained therein comes into contact with the base of the parison mould. When this happens, the cam 107 operates the valve 109 and places the parison mould 39 in connection with the vacuum chamber, thus exhausting the air from the parison mould and causing the glass to rise therein and fill it. The time at which the parison mould is filled corresponds substantially to that at which the crank pin 16 is passing over its dead point 180° in advance of the position in which it is shown in Fig. 1. The period of dwell of the transporter 11 below the parison mould is varied by lengthening or shortening the rod 15 in the manner hereinbefore explained and thereby varying the stress to which the spring contained in the rod is subjected. As the crank pin 16 moves onward, the transporter 11 is moved away from the parison mould and is returned towards the supplementary chamber 6, the door 19 moving to its vertical position in advance of the transporter. As the transporter 11 moves away from the bottom of the parison mould, the cam 74 comes into action and permits the knife 68, under the influence of the spring 76, to move quickly forward and sever the string or rope of glass pendent from the bottom of the parison mould. The knife 68 is then returned by the cam 74 acting through the lever 72, link 71 and bell crank lever 70. During the return movement of the transporter 11 and after the severing of the pendent string or rope of glass, the cam 84<sup>a</sup> comes into action and causes the clutch 81 to couple up the two parts of the shaft 77 and half a revolution to be imparted to the shaft 67, thereby causing the parison mould 39 to open, the finishing mould 33 to close about the parison suspended from the stationary neck mould, the bottom mould 62 to move up and close the lower end of the finishing mould, and the hollow rod 56 to move upward; when this happens the cam 108 operates the valve 110, and permits air under pressure to act on the glass and blow the parison to the shape of the finishing mould. The cam 106 now releases the clutch latch 101 which immediately moves into a position in which it acts on and disconnects the clutch 104, thus uncoupling the shaft 85 from its driving spur wheel 103. The parts of the glass shaping and blowing machine are now in the positions shown in Fig. 1 and remain at rest during the time required for a fresh charge of glass to be introduced into the transporter 11 and during the time of blowing and cooling the bottle in the finishing mould. This time is determined by the disc 94 whose rate of rotation is so regulated as to give the variation of time required for solidification of the bottle according to its weight, the quality of the glass and its temperature.

The cam 106 instead of having a single depression as shown in Fig. 1, may have a second depression placed diametrically opposite as shown in dotted lines. This modified construction is employed in order that a longer dwell of the transporter 11 below the parison mould may be obtained. In the arrangement shown in Fig. 1, the dwell of the transporter 11 below the parison mould can only be varied by altering the length of the spring rod 15 and the compression of the contained spring. The variation of the dwell thus obtained is not always sufficient. By providing the cam 106 with a second depression placed diametrically opposite as shown in the drawings, this second depression comes opposite to the roller on the lever 101 at the moment when the transporter 11 comes below the parison mould, and there is produced a declutching of the shaft 85 and a stoppage of the shaft 75 and of the crank pin 16 which drives the transporter. The disc 94 is provided with a second pin 98$^a$ which is suitably arranged and acts on the lever 99 to cause the operation of the clutch latch 101 when the desired dwell of the transporter 11 below the parison mould has elapsed. By providing the disc 94 with a series of holes, in any one of which the second pin may be placed, the dwell of the transporter below the parison mould can be readily altered.

The foregoing description relates to a single glass shaping and blowing machine operated by driving and controlling means, but it will be obvious that the driving and controlling means may operate a group of glass shaping and blowing machines which may draw their supply of glass from a single transporter 11.

What I claim is:

1. Apparatus for manufacturing glassware comprising a glass melting furnace, a chamber communicating with the furnace, a glass shaping machine having a mold adjacent the chamber, the chamber having a door in its side towards the machine, a transporter for molten glass, automatic means for moving the transporter alternately to glass receiving position in the chamber and to position to deliver glass to the mold, and automatic means operating the door in timed relation with the transporter.

2. Apparatus for manufacturing glassware comprising a glass melting furnace having a discharge orifice, a chamber surrounding the orifice and normally closed against the ingress of cold air but having a door in one side, a glass shaping machine having a mold adjacent the door, a transporter for molten glass, automatic means for moving the transporter successively to receiving position in the chamber and to position to deliver glass to the mold, and automatic means for operating the door in timed relation with the transporter.

3. Apparatus for manufacturing glassware, comprising a glass melting furnace having a downwardly discharging orifice, walls projecting from the furnace forming a chamber surrounding the orifice and normally closed against the ingress of cold air, the chamber having a door, a glass shaping machine having a mold adjacent the door, a transporter for molten glass, automatic means for moving the transporter successively to position in the chamber beneath the orifice and to position to discharge glass to the mold, and automatic means for opening the door to admit the transporter and to close it when the transporter is withdrawn.

4. Apparatus for manufacturing glass bottles comprising a glass melting furnace having a downwardly discharging orifice, a chamber surrounding the orifice and having a door beneath the orifice, a glass shaping machine having a parison mold, a transporter for molten glass, automatic means for oscillating the transporter alternately to position beneath the orifice and to position beneath the parison mold, and automatic means for operating the door in timed relation to the transporter.

5. Apparatus for the manufacture of glass bottles comprising in combination a glass-melting furnace, a container for molten glass communicating with the furnace, a glass-shaping and blowing machine arranged in front of the container and at a distance therefrom, a transporter for molten glass and means to reciprocate automatically the said transporter to and fro between the container and the parison mould of the shaping and blowing machine, and also to operate the moulds and valves of the shaping and blowing machine, all in correct functional co-relationship, and means for altering the duration of the period the glass is within the finishing mould, comprising a rotatable disc governing the operating means for the moulds and valves and means to vary the rate of rotation of said disc.

6. Apparatus for the manufacture of glass bottles comprising in combination a glass-melting furnace, a container for molten glass communicating with the furnace, a glass-shaping and blowing machine arranged in front of the container and at a distance therefrom, a transporter for molten glass, means to reciprocate automatically the said transporter to and fro between the container and parison mould of the shaping and blowing machine, and also to operate the moulds and valves of the shaping and blowing machine, all in correct functional co-relationship, means for altering the duration of the period the glass is within the parison mould comprising two cams relatively adjustable on a cam-carrying member, and means for altering the duration of the period the glass is within the finishing mould, comprising a rotatable disc governing the operating means for the moulds and valves and means to vary the rate of rotation of said disc.

7. Apparatus for manufacturing glassware comprising a glass melting furnace, a mold, a transporter for molten glass, and automatic means for moving the transporter to and fro from furnace to mold and allowing a dwell at each end of the movement, the means comprising a driving device and an adjustable spring rod connecting the device to the transporter, whereby the dwell at the end of the movement may be varied without varying the duration of the entire cycle of movement.

8. Apparatus for manufacturing glass bottles comprising a glass melting furnace, a glass shaping machine having a parison mold, a transporter for carrying glass from the furnace to the parison mold, and automatic means for moving the transporter and operating the machine, the means comprising an adjustable device governing the time the glass is within the parison mold and an independently adjustable device governing the time the transporter is in delivering relation to the parison mold.

9. Apparatus for manufacturing glass bottles comprising a glass melting furnace, a glass shaping machine having a parison mold and a blow mold, a transporter for carrying molten glass from the furnace to the parison mold, automatic means for moving the transporter and operating the machine so constructed that while one parison is being blown in the blow mold the transporter is receiving from the furnace glass for another parison, and means adjustable while the machine is in operation for varying the time the transporter is receiving glass and the glass is in the blow mold without varying the duration of the other operations of the machine.

10. Apparatus for manufacturing glass bottles comprising a glass melting furnace, a mold adapted to receive glass through its lower end, a transporter for molten glass oscillatable in a vertical plane from a position beneath the orifice to a position beneath the mold, and a knife movable across the lower end of the mold and towards the furnace in its cutting stroke.

11. In an automatic glass shaping and blowing machine having a parison mold and a blow mold, a drive shaft moving continuously at uniform speed driving and governing the machine, and means for altering the period the glass is within the blow mold without changing the duration of other operations of the machine.

12. In an automatic glass shaping and blowing machine having a parison mold and a blow mold, a drive shaft moving continuously at uniform speed driving and governing the machine, and means adjustable while the machine is in operation for altering the period the glass is within the blow mold.

13. In an automatic glass shaping and blowing machine having a parison mold and a blow mold, a drive shaft moving continuously at a uniform speed driving and governing the machine, and means adjustable while the machine is in operation for altering the period the glass is within the blow mold without changing the duration of operations of the machine before or after the glass is in the blow mold.

14. In an automatic glass shaping and blowing machine having a parison mold and a blow mold, a drive shaft moving continuously at a uniform speed, a clutch connecting the drive shaft with devices for operating the machine, means for opening the clutch while the glass is in one of the molds, means for closing the clutch, and change speed connections between the last said means and the drive shaft.

15. In an automatic glass shaping and blowing machine having a parison mold and a blow mold, a drive shaft moving continuously at a uniform speed, a clutch connecting the shaft with devices for operating the machine, means for opening the clutch while the glass is in one of the molds, a disc, connections between the clutch and the disc for closing the clutch when the disc is in a certain position, a friction wheel driven by the drive shaft and engaging the face of the disc, and means operable while the machine is in operation for moving the wheel radially of the disc.

Dated this 21st day of March, 1919.

EMILE ROIRANT.